(12) United States Patent
Roth et al.

(10) Patent No.: US 10,819,921 B2
(45) Date of Patent: Oct. 27, 2020

(54) CAMERA ASSEMBLY HAVING A SINGLE-PIECE COVER ELEMENT

(71) Applicant: GOOGLE LLC, Mountain View, CA (US)

(72) Inventors: Adina Roth, Mountain View, CA (US); Michael Brickner, Mountain View, CA (US); Mi Zhou, Mountain View, CA (US); Amber Luttmann Volmering, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 407 days.

(21) Appl. No.: 15/607,368

(22) Filed: May 26, 2017

(65) Prior Publication Data

US 2018/0343402 A1  Nov. 29, 2018

Related U.S. Application Data

(60) Provisional application No. 62/511,302, filed on May 25, 2017.

(51) Int. Cl.
*H04N 5/33* (2006.01)
*H04N 5/225* (2006.01)
(Continued)

(52) U.S. Cl.
CPC ............. *H04N 5/332* (2013.01); *G02B 5/208* (2013.01); *H04N 5/2252* (2013.01);
(Continued)

(58) Field of Classification Search
CPC .... H04N 5/332; H04N 5/2252; H04N 5/2254; H04N 5/2256; H04N 5/2351;
(Continued)

(56) References Cited

U.S. PATENT DOCUMENTS 6,018,414 A * 1/2000 Chipper ............... G08B 13/193
359/354
2003/0214733 A1   11/2003 Fujikawa
(Continued)

FOREIGN PATENT DOCUMENTS

CN          201203743         3/2009

OTHER PUBLICATIONS

Google LLC, Extended Search Report, Application No. 18156966.6, dated Jun. 26, 2018, 11 pgs.

*Primary Examiner* — Jayanti K Patel
*Assistant Examiner* — Richard B Carter
(74) *Attorney, Agent, or Firm* — Morgan, Lewis & Bockius LLP

(57) ABSTRACT

The various implementations described herein include methods, devices, and systems for illuminating and capturing scenes. In one aspect, a video camera assembly includes: (1) an image sensor having a field of view corresponding to a scene; (2) infrared illuminators to selectively illuminate the scene; and (3) a single-piece cover positioned in front of the image sensor and the illuminators such that light from the illuminators is directed through the cover and light from the scene passes through the cover prior to entering the image sensor, including: (a) a first portion corresponding to the image sensor and substantially transparent to visible light and IR light; (b) a second portion corresponding to the one or more IR illuminators and coated to be substantially transparent to IR light; and (c) a third portion between the first portion and the second portion and coated to be substantially opaque to IR and visible light.

20 Claims, 11 Drawing Sheets

(51) Int. Cl.
  *H04N 5/235*  (2006.01)
  *G02B 5/20*  (2006.01)
  *H04N 7/18*  (2006.01)
  *H04N 5/232*  (2006.01)
  *G02B 13/14*  (2006.01)

(52) U.S. Cl.
  CPC ......... *H04N 5/2254* (2013.01); *H04N 5/2256* (2013.01); *H04N 5/2351* (2013.01); *G02B 13/14* (2013.01); *H04N 5/23245* (2013.01); *H04N 7/181* (2013.01)

(58) Field of Classification Search
  CPC .... H04N 5/23245; H04N 7/181; G02B 5/208; G02B 13/14
  USPC ........................................................ 348/164
  See application file for complete search history.

(56) References Cited

U.S. PATENT DOCUMENTS

2013/0048837 A1  2/2013  Pope
2017/0140221 A1  5/2017  Ollila
2018/0013934 A1* 1/2018  Germe ................. H04N 5/2252

* cited by examiner

Smart Device 204

CAMERA ASSEMBLY HAVING A SINGLE-PIECE COVER ELEMENT

RELATED APPLICATIONS

This application claims priority to U.S. Provisional Application No. 62/511,302, entitled "Video Camera Assembly," filed May 25, 2017, which is hereby incorporated by reference in its entirety.

This application is related to U.S. patent application Ser. No. 15/607,387, filed May 26, 2017, entitled "Thermal Management for a Compact Electronic Device," U.S. patent application Ser. No. 15/607,380, filed May 26, 2017, entitled "Video Camera Assembly Having an IR Reflector," U.S. patent application Ser. No. 15/606,888, filed May 26, 2017, entitled "Stand Assembly for an Electronic Device Providing Multiple Degrees of Freedom and Built-in Cables," and U.S. Design application No. 29/605,503, filed May 26, 2017, entitled "Camera," each of which is hereby incorporated by reference in its entirety.

This application is also related to U.S. patent application Ser. No. 15/594,518, filed May 12, 2017, entitled "Methods and Systems for Presenting Image Data for Detected Regions of Interest;" U.S. patent application Ser. No. 15/334,172, filed Oct. 25, 2016, entitled "Method and System for Categorizing Motion Events;" and U.S. patent application Ser. No. 15/403,067, filed Jan. 10, 2017, entitled "Systems, Methods, and Devices for Managing Coexistence of Multiple Transceiver Devices Using Bypass Circuitry," each of which is hereby incorporated by reference in its entirety.

TECHNICAL FIELD

This relates generally to camera assemblies, including but not limited to, video camera assemblies having single-piece cover elements.

BACKGROUND

Video surveillance cameras are used extensively. Usage of video cameras in residential and commercial environments has increased substantially, in part due to lower prices and simplicity of deployment.

Security cameras are often wanted to monitor dark locations, or locations during night and other low-light scenarios. Usually, this needs to be done without flooding the area with visible light. In order to allow the camera to see the scene with no visible light, cameras are often equipped with IR Illumination which is not visible to the human eye, but is visible to the camera. This illumination is often included in the camera itself and will turn on when needed. However, in order to maintain a single unit that contains the illumination and the camera, there are often complications. One of these is that if IR light from the illumination system enters the camera before it has interacted with the scene, it can wash out an image, or cause no image to be seen because of the stray light (e.g., a full blank white/gray image).

SUMMARY

Accordingly, there is a need for systems and/or devices with more efficient, accurate, and effective methods for illuminating, capturing, and analyzing scenes. Such systems, devices, and methods optionally complement or replace conventional systems, devices, and methods for illuminating, capturing, and analyzing scenes.

One potential solution is physical baffling or shielding, which breaks up the camera into multiple sections. This potential solution is problematic because it increases the size of the product and also separates the front face into multiple elements. Separate elements prevent a streamline look at the front of the camera and increase the challenge of weatherproofing and sealing. This potential solution also adds additional parts to the product, which adds cost and manufacturing complexity. Current security cameras on the market do not include single pieces of cover glass or plastic (to protect the camera from the elements both indoors and out) that covers the camera and the IR illuminators.

It is desirable to have a single-piece cover glass (or cover plastic or other transparent substance) as it creates a more aesthetically pleasing look, reduces production costs by reducing the number of parts, reduces complexity by eliminating the need to tightly fit multiple sections, increases waterproofing of the device by eliminating seams between multiple sections, and increases a quality of the images captured by the image sensor.

It is also desirable that the camera provide visual and/or audio feedback to a user. The feedback may concern an operational status of the camera itself, the operational status of another electronic device associated with the camera, and/or the operational status of a set of electronic devices associated with the camera.

In environments in which security cameras are commonly deployed, such as in a work or home environment (indoors or outdoors), it is advantageous to configure the camera with physical features that can provide real time camera status information and/or audio/visual content that indicates or complements camera processing activity, to occupants of the environment without disturbing operation of the camera or the occupants. In some implementations, such physical features include a light ring that is provided at a periphery of the camera and is configured to be visible to occupants of the environment from a wide range of positions in the environment. For example, in some camera implementations, the light ring is configured to be visible in a range of positions that includes at least areas of the environment that fall within the camera's field of view. In some camera implementations, the light ring has a plurality of individual lighting elements, each having associated lighting characteristics that are individually controllable to reflect local camera status and/or a camera processing state/operation. In some configurations, the controllable lighting characteristics include one or more of on/off state, hue, saturation and/or brightness/intensity. In some configurations, the lighting elements are controlled individually to display an overall pattern (e.g., an entire ring or one or more portions of a ring) that can be static or dynamic (e.g., one or more rotating portions of a ring) consisting of a single displayed color or two or more different displayed colors. Each of the patterns can conform to a visual language and correspond to a camera status and/or a camera processing operation. For example, a color or a pattern of two or more different colors (static or dynamic) can indicate that the camera is on or off, has an active or inactive connection to a server (e.g., a server that performs image processing or that distributes video and notifications to remote users), is actively processing local information from the environment, or has received a notification or status information from another smart device in the home environment or a server. In camera implementations that include a speaker, the physical feature (e.g., a light ring) can be controlled by the camera to display patterns that correspond to audible beats/rhythm of music being played from the speaker in a range of colors selected to match the tempo/feeling of the music. Providing such information via light patterns is advantageous as this is readily perceived by all/most users in the environment (even if they do not have access to camera smart phone app.) without intruding on activity of occupants in the environment, as audible alerts could do.

In one aspect, some implementations include a video camera assembly having: (1) one or more processors configured to operate the video camera assembly in a day mode and in a night mode; (2) an image sensor having a field of view of a scene and configured to capture video of a first portion of the scene while in the day mode of operation and in the night mode of operation, the first portion corresponding to the field of view of the image sensor; (3) one or more infrared (IR) illuminators configured to provide illumination during the night mode of operation while the image sensor captures video; and (4) an IR reflector component configured to: (i) substantially restrict the illumination onto the first portion of the scene, and (ii) illuminate the first portion in a substantially uniform manner across the field of view of the image sensor.

In another aspect, some implementations include a camera assembly having: (1) an image sensor having a field of view corresponding to a scene; (2) one or more infrared (IR) illuminators configured to selectively illuminate the scene; and (3) a single-piece cover element positioned in front of the image sensor and the one or more IR illuminators such that light from the one or more IR illuminators is directed through the cover element and light from the scene passes through the cover element prior to entering the image sensor, the cover element including: (a) a first portion corresponding to the image sensor, the first portion substantially transparent to visible light and IR light; (b) a second portion corresponding to the one or more IR illuminators, the second portion coated to be substantially transparent to IR light; and (c) a third portion between the first portion and the second portion, the third portion coated to be substantially opaque to IR and visible light.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 1:
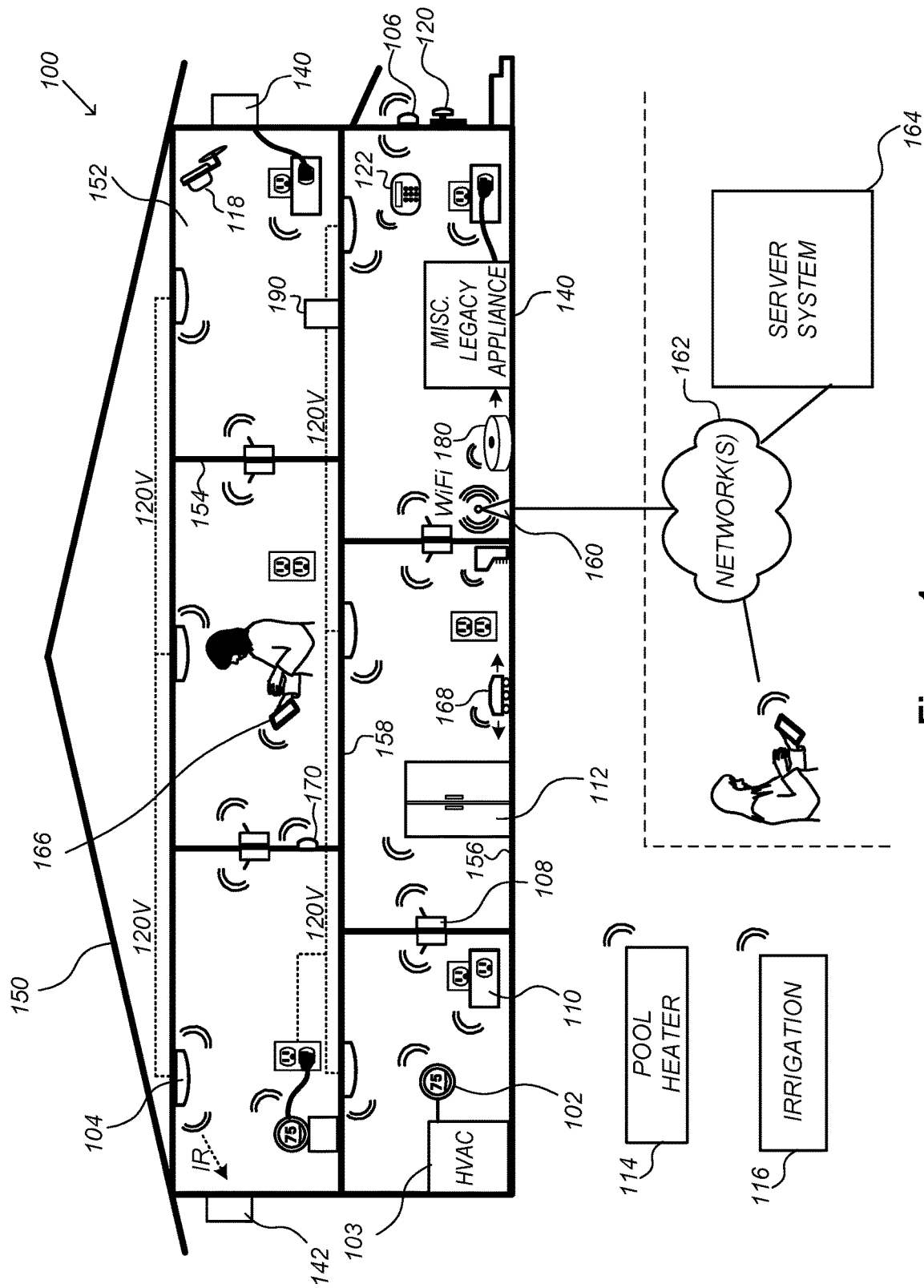
FIG. 1 is a representative smart home environment in accordance with some implementations.

FIG. 1 is an example smart home environment 100 in accordance with some implementations. The smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2A) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come). In some implementations, the smart doorbell 106 includes some or all of the components and features of the camera 118. In some implementations, the smart doorbell 106 includes a camera 118.

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio). In some implementations, the cameras 118 are each configured to operate in a day mode and in a low-light mode (e.g., a night mode). In some implementations, the cameras 118 each include one or more IR illuminators for providing illumination while the camera is operating in the low-light mode. In some implementations, the cameras 118 include one or more outdoor cameras. In some implementations, the outdoor cameras include additional features and/or components such as weatherproofing and/or solar ray compensation.

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a server system 164 (also called a central server system and/or a cloud-computing system herein). The server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device. In some implementations, hub device 180 further comprises a local storage device for storing data related to, or output by, smart devices of smart home environment 100. In some implementations, the data includes one or more of: video data output by a camera device, metadata output by a smart device, settings information for a smart device, usage logs for a smart device, and the like.

In some implementations, smart home environment 100 includes a local storage device 190 for storing data related to, or output by, smart devices of smart home environment 100. In some implementations, the data includes one or more of: video data output by a camera device (e.g., camera 118), metadata output by a smart device, settings information for a smart device, usage logs for a smart device, and the like. In some implementations, local storage device 190 is communicatively coupled to one or more smart devices via a smart home network (e.g., smart home network 202, FIG. 2A). In some implementations, local storage device 190 is selectively coupled to one or more smart devices via a wired and/or wireless communication network. In some implementations, local storage device 190 is used to store video data when external network conditions are poor. For example, local storage device 190 is used when an encoding bitrate of camera 118 exceeds the available bandwidth of the external network (e.g., network(s) 162). In some implementations, local storage device 190 temporarily stores video data from one or more cameras (e.g., camera 118) prior to transferring the video data to a server system (e.g., server system 164).

Figure 2:
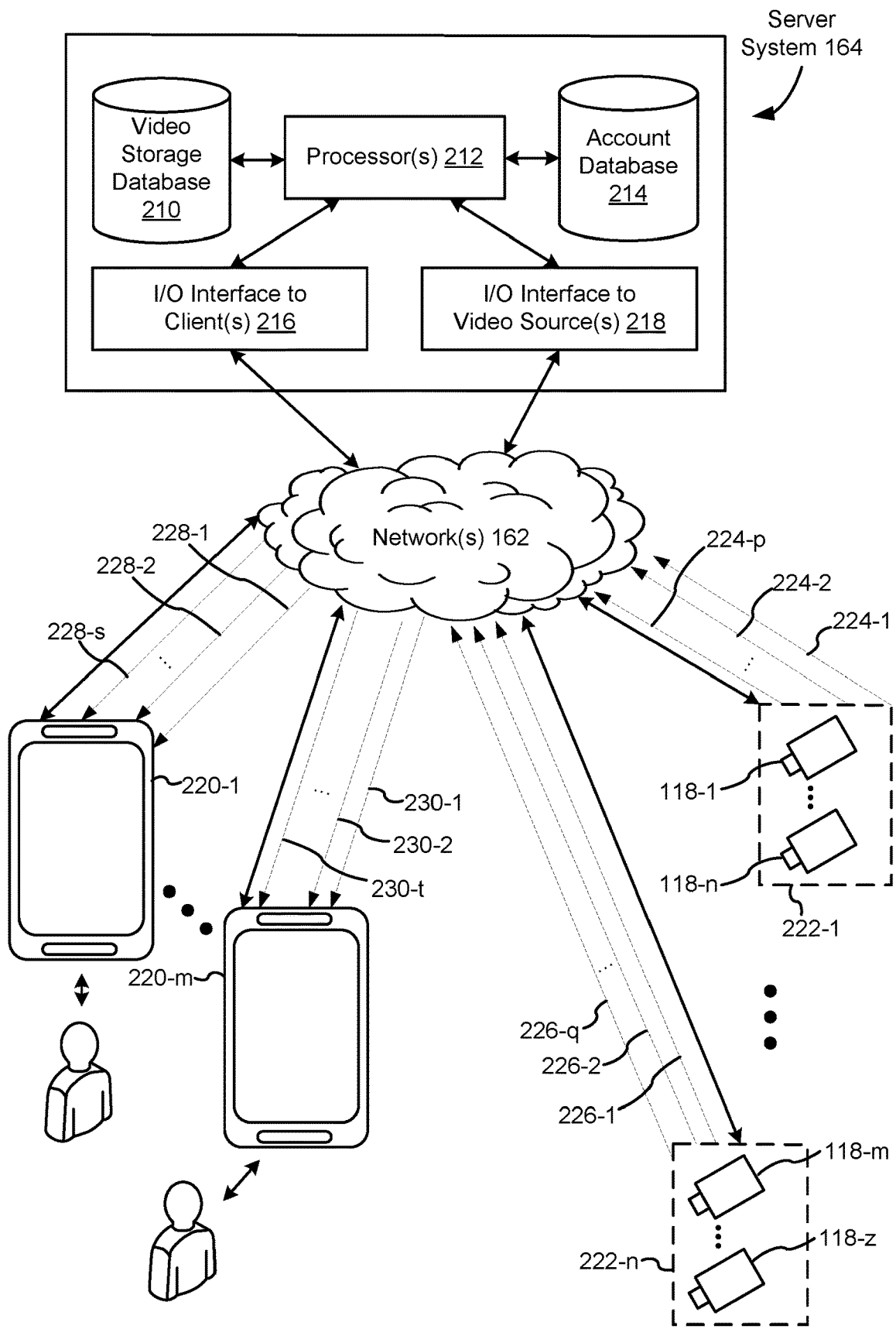
FIG. 2 is a representative operating environment in which a server system interacts with client devices and smart devices in accordance with some implementations.

FIG. 2 illustrates a representative operating environment in which a server system 164 provides data processing for monitoring and facilitating review of events (e.g., motion, audio, security, etc.) in video streams captured by video cameras 118. As shown in FIG. 2, the server system 164 receives video data from video sources 222 (including cameras 118) located at various physical locations (e.g., inside homes, restaurants, stores, streets, parking lots, and/or the smart home environments 100 of FIG. 1). Each video source 222 may be bound to one or more reviewer accounts, and the server system 164 provides video monitoring data for the video source 222 to client devices 220 associated with the reviewer accounts. For example, the portable electronic device 166 is an example of the client device 220. In some implementations, the server system 164 is a video processing server that provides video processing services to video sources and client devices 220.

In some implementations, each of the video sources 222 includes one or more video cameras 118 that capture video and send the captured video to the server system 164 substantially in real-time. In some implementations, each of the video sources 222 includes a controller device (not shown) that serves as an intermediary between the one or more cameras 118 and the server system 164. The controller device receives the video data from the one or more cameras 118, optionally performs some preliminary processing on the video data, and sends the video data to the server system 164 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the server system 164.

In accordance with some implementations, each of the client devices 220 includes a client-side module. The client-side module communicates with a server-side module executed on the server system 164 through the one or more networks 162. The client-side module provides client-side functionality for the event monitoring and review processing and communications with the server-side module. The server-side module provides server-side functionality for event monitoring and review processing for any number of client-side modules each residing on a respective client device 220. The server-side module also provides server-side functionality for video processing and camera control for any number of the video sources 222, including any number of control devices and the cameras 118.

In some implementations, the server system 164 includes one or more processors 212, a video storage database 210, an account database 214, an I/O interface to one or more client devices 216, and an I/O interface to one or more video sources 218. The I/O interface to one or more clients 216 facilitates the client-facing input and output processing. The account database 214 stores a plurality of profiles for reviewer accounts registered with the video processing server, where a respective user profile includes account credentials for a respective reviewer account, and one or more video sources linked to the respective reviewer account. The I/O interface to one or more video sources 218 facilitates communications with one or more video sources 222 (e.g., groups of one or more cameras 118 and associated controller devices). The video storage database 210 stores raw video data received from the video sources 222, as well as various types of metadata, such as motion events, event categories, event category models, event filters, and event masks, for use in data processing for event monitoring and review for each reviewer account.

Examples of a representative client device 220 include a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, a vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 164 is implemented on one or more standalone data processing apparatuses or a distributed network of computers. In some implementations, the server system 164 also employs various virtual devices and/or services of third party service providers (e.g., third-party cloud service providers) to provide the underlying computing resources and/or infrastructure resources of the server system 164. In some implementations, the server system 164 includes, but is not limited to, a server computer, a handheld computer, a tablet computer, a laptop computer, a desktop computer, or a combination of any two or more of these data processing devices or other data processing devices.

The server-client environment shown in FIG. 2 includes both a client-side portion (e.g., the client-side module) and a server-side portion (e.g., the server-side module). The division of functionality between the client and server portions of operating environment can vary in different implementations. Similarly, the division of functionality between a video source 222 and the server system 164 can vary in different implementations. For example, in some implementations, the client-side module is a thin-client that provides only user-facing input and output processing functions, and delegates all other data processing functionality to a backend server (e.g., the server system 164). Similarly, in some implementations, a respective one of the video sources 222 is a simple video capturing device that continuously captures and streams video data to the server system 164 with limited or no local preliminary processing on the video data. Although many aspects of the present technology are described from the perspective of the server system 164, the corresponding actions performed by a client device 220 and/or the video sources 222 would be apparent to one of skill in the art. Similarly, some aspects of the present technology may be described from the perspective of a client device or a video source, and the corresponding actions performed by the video server would be apparent to one of skill in the art. Furthermore, some aspects of the present technology may be performed by the server system 164, a client device 220, and a video source 222 cooperatively.

In some implementations, a video source 222 (e.g., a camera 118) transmits one or more streams of video data to the server system 164. In some implementations, the one or more streams may include multiple streams, of respective resolutions and/or frame rates, of the raw video captured by the camera 118. In some implementations, the multiple streams may include a "primary" stream with a certain resolution and frame rate, corresponding to the raw video captured by the camera 118, and one or more additional streams. An additional stream may be the same video stream as the "primary" stream but at a different resolution and/or frame rate, or a stream that captures a portion of the "primary" stream (e.g., cropped to include a portion of the field of view or pixels of the primary stream) at the same or different resolution and/or frame rate as the "primary" stream.

In some implementations, one or more of the streams are sent from the video source 222 directly to a client device 220 (e.g., without being routed to, or processed by, the server system 164). In some implementations, one or more of the streams is stored at the camera 118 (e.g., in memory 406, FIG. 4) and/or a local storage device (e.g., a dedicated recording device), such as a digital video recorder (DVR). For example, in accordance with some implementations, the camera 118 stores the most recent 24 hours of video footage recorded by the camera. In some implementations, portions of the one or more streams are stored at the camera 118 and/or the local storage device (e.g., portions corresponding to particular events or times of interest).

In some implementations, the server system 164 transmits one or more streams of video data to a client device 220 to facilitate event monitoring by a user. In some implementations, the one or more streams may include multiple streams, of respective resolutions and/or frame rates, of the same video feed. In some implementations, the multiple streams include a "primary" stream with a certain resolution and frame rate, corresponding to the video feed, and one or more additional streams. An additional stream may be the same video stream as the "primary" stream but at a different resolution and/or frame rate, or a stream that shows a portion of the "primary" stream (e.g., cropped to include portion of the field of view or pixels of the primary stream) at the same or different resolution and/or frame rate as the "primary" stream, as described in greater detail in U.S. patent application Ser. No. 15/594,518, which is hereby incorporated by reference in its entirety.

Figure 3:
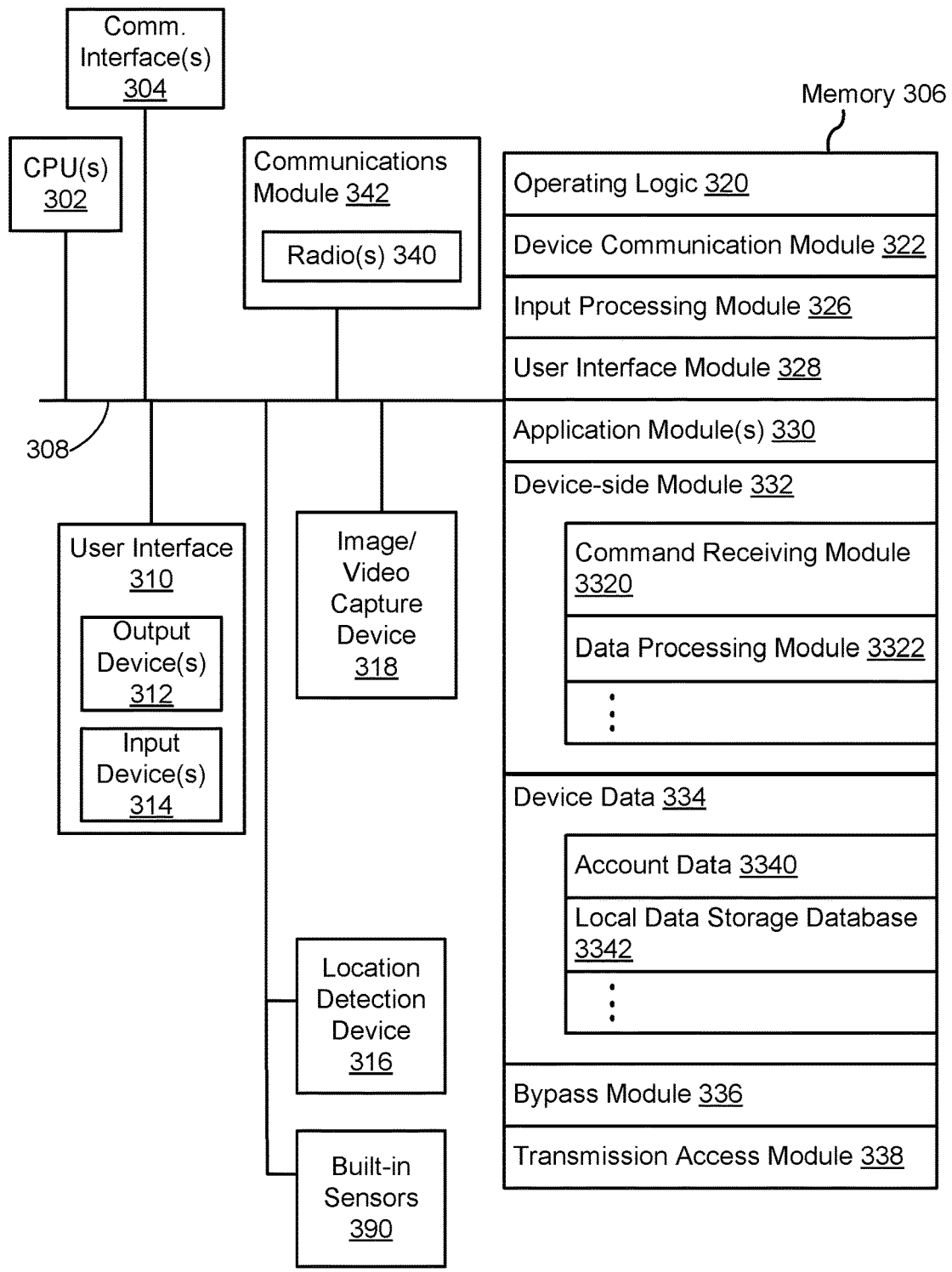
FIG. 3 is a block diagram illustrating a representative smart device, in accordance with some implementations.

FIG. 3 is a block diagram illustrating a representative smart device 204 in accordance with some implementations. In some implementations, the smart device 204 (e.g., any devices of a smart home environment 100, FIG. 1) includes one or more processing units (e.g., CPUs, ASICs, FPGAs, microprocessors, and the like) 302, one or more communication interfaces 304, memory 306, communications module 342 with radios 340, and one or more communication buses 308 for interconnecting these components (sometimes called a chipset). In some implementations, the user interface 310 includes one or more output devices 312 that enable presentation of media content, including one or more speakers and/or one or more visual displays. In some implementations, the user interface 310 also includes one or more input devices 314, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 318 (e.g., cameras, video cameras, scanners, photo sensor units).

The built-in sensors 390 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 340 enable one or more radio communication networks in the smart home environments, and allow a smart device 204 to communicate with other devices. In some implementations, the radios 340 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) custom or standard wired protocols (e.g., Ethernet, HomePlug, etc.), and/or any other suitable communication protocol, including communication protocols not yet developed as of the filing date of this document.

The communication interfaces 304 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

The memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, or alternatively the non-volatile memory within the memory 306, includes a non-transitory computer readable storage medium. In some implementations, the memory 306, or the non-transitory computer readable storage medium of the memory 306, stores the following programs, modules, and data structures, or a subset or superset thereof:

operating logic 320 including procedures for handling various basic system services and for performing hardware dependent tasks;

a device communication module 322 for connecting to and communicating with other network devices (e.g., network interface 160, such as a router that provides Internet connectivity, networked storage devices, network routing devices, server system 164, etc.) connected to one or more networks 162 via one or more communication interfaces 304 (wired or wireless);

an input processing module 326 for detecting one or more user inputs or interactions from the one or more input devices 314 and interpreting the detected inputs or interactions;

a user interface module 328 for providing and displaying a user interface in which settings, captured data, and/or other data for one or more devices (e.g., the smart device 204, and/or other devices in smart home environment 100) can be configured and/or viewed;

one or more applications 330 for execution by the smart device (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);

a device-side module 332, which provides device-side functionalities for device control, data processing and data review, including but not limited to:

a command receiving module 3320 for receiving, forwarding, and/or executing instructions and control commands (e.g., from a client device 220, from a server system 164, from user inputs detected on the user interface 310, etc.) for operating the smart device 204;

a data processing module 3322 for processing data captured or received by one or more inputs (e.g., input devices 314, image/video capture devices 318, location detection device 316), sensors (e.g., built-in sensors 390), interfaces (e.g., communication interfaces 304, radios 340), and/or other components of the smart device 204, and for preparing and sending processed data to a device for review (e.g., client devices 220 for review by a user); and device data 334 storing data associated with devices (e.g., the smart device 204), including, but is not limited to:

account data 3340 storing information related to user accounts loaded on the smart device 204, wherein such information includes cached login credentials, smart device identifiers (e.g., MAC addresses and UUIDs), user interface settings, display preferences, authentication tokens and tags, password keys, etc., local data storage database 3342 for selectively storing raw or processed data associated with the smart device 204 (e.g., video surveillance footage captured by a camera 118);

a bypass module 336 for detecting whether radio(s) 340 are transmitting signals via respective antennas coupled to the radio(s) 340 and to accordingly couple radio(s) 340 to their respective antennas either via a bypass line or an amplifier (e.g., a low noise amplifier); and a transmission access module 338 for granting or denying transmission access to one or more radio(s) 340 (e.g., based on detected control signals and transmission requests).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above. Furthermore, the memory 306, optionally, stores additional modules and data structures not described above.

Figure 4A:
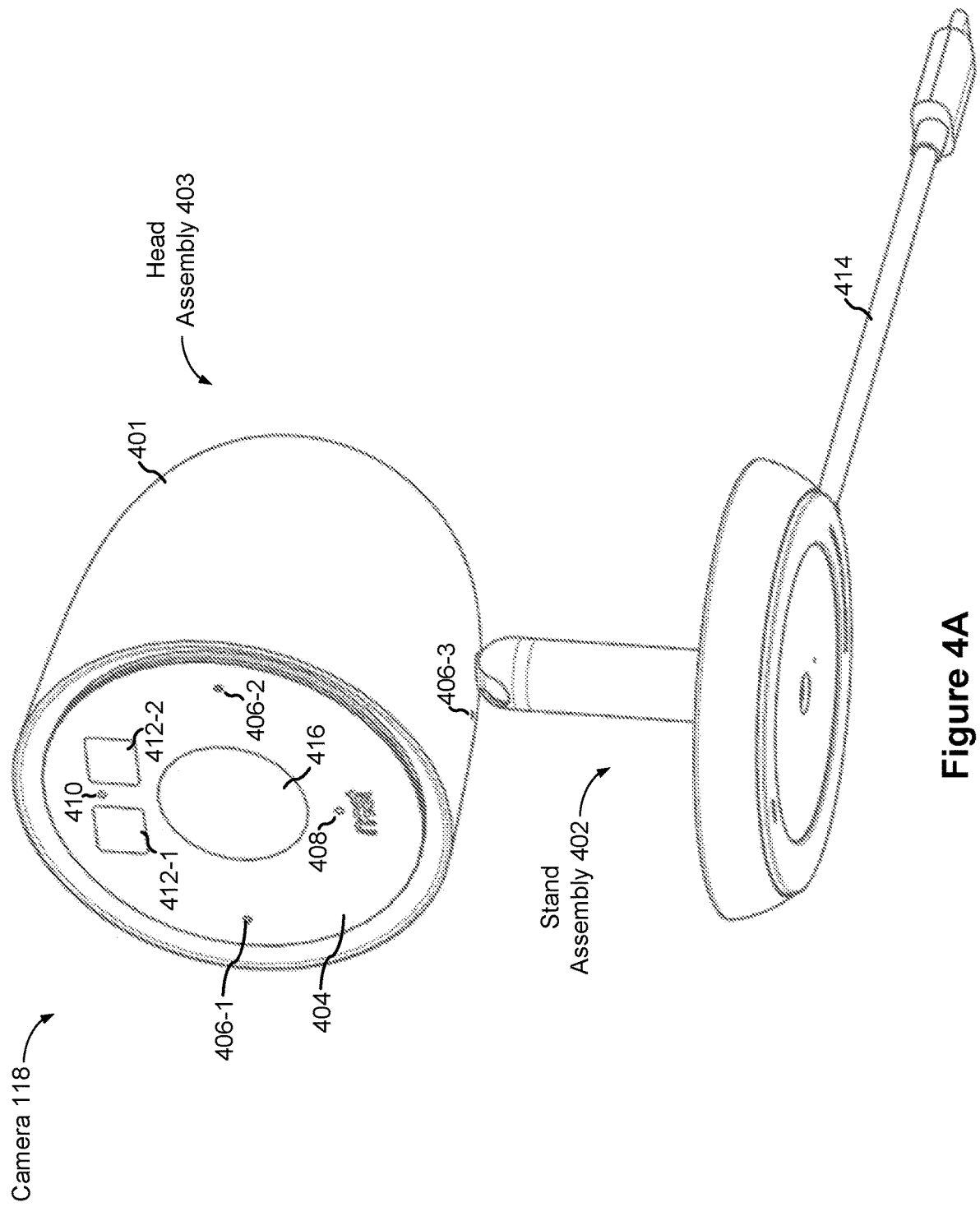
FIG. 4A is a perspective view of a representative camera assembly in accordance with some implementations.

FIG. 4A is a perspective view of a camera assembly 118 in accordance with some implementations. As shown in FIG. 4A, the camera 118 includes a head assembly 403, a stand assembly 402, and a cable 414 (e.g., for powering the camera 118 and/or transferring data between the camera 118 and a second electronic device.). The head assembly 403 includes a cover element 404 and a casing 401 (also sometimes called a housing). In accordance with some implementations, the cover element 404 has IR transparent portions 412 for IR illuminators, visible and IR transparent portion 416 for an image sensor, and semi-transparent portions 410 (corresponding to an ambient light sensor) and 408 (corresponding to a status LED). In accordance with some implementations, the cover element 404 also includes apertures 406 for microphones. In accordance with some implementations, the casing 401 includes an aperture 406-3 for a microphone. In some implementations, the camera assembly 118 includes two or more microphones (e.g., with microphones at locations other than the locations of apertures 406).

In some implementations, the casing 401 has two or more layers. In some implementations, the inner layer is composed of a thermally conductive resin. In some implementations, the outer layer is a structural jacket configured to protect the camera 118 from environmental conditions such as moisture or electromagnetic charge (e.g., static electricity). In some implementations, the structural jacket is configured to protect the camera 118 from impacts, such as from a collision with another object or the ground.

Figure 4B:
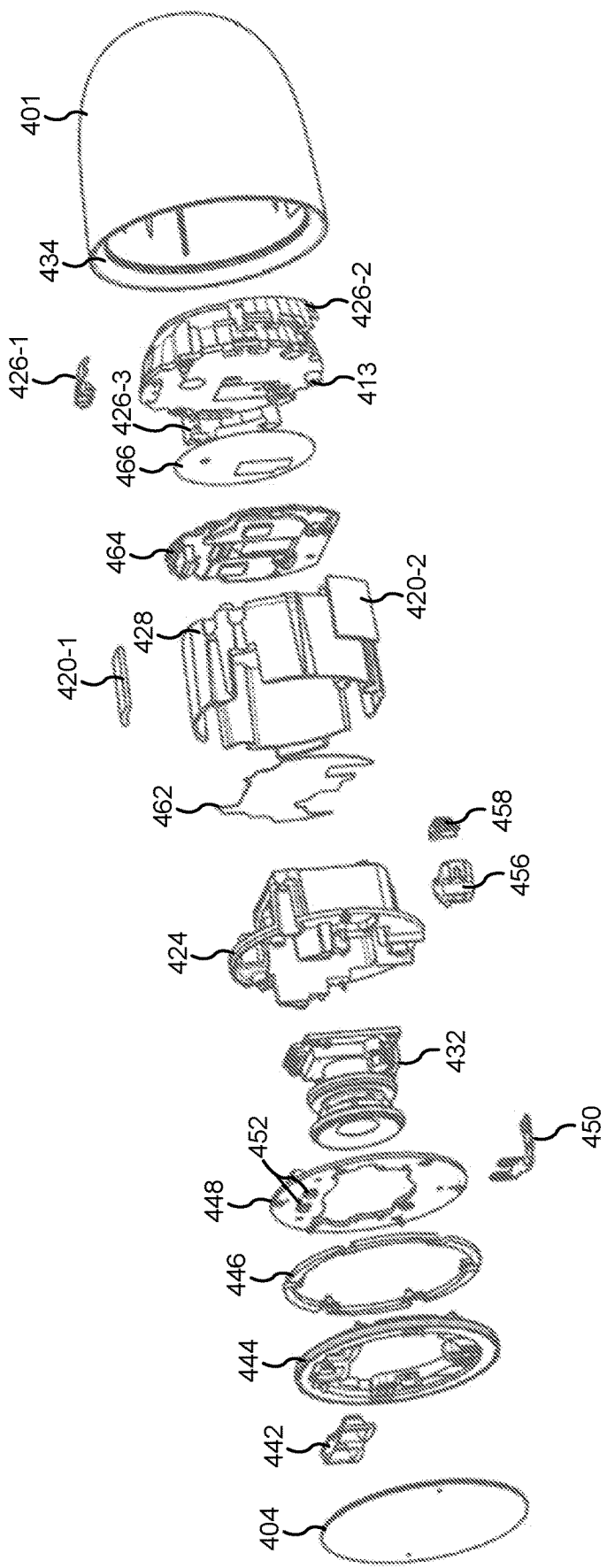
FIG. 4B is a component view of a representative camera assembly in accordance with some implementations.

FIG. 4B shows an expanded view of the camera 118 in accordance with some implementations. As shown in FIG. 4B, the camera 118 includes cover element 404, an infrared (IR) reflector 442, a light diffuser 444, a light guide 446, a light ring 448, a microphone assembly 450, the image sensor assembly 432, the fryer basket 424, stand coupling elements 456 and 458, a thermal receiver structure 428 (e.g., having a shape like that of a fryer pot, hereinafter referred to as "fryer pot 428"), a thermal insulator 462 adapted to thermally isolate the fryer pot 428 from a thermal mount structure 424 (e.g., having a shape like that of a fryer basket, hereinafter referred to as "fryer basket 424"), the main board 464, the thermally conductive sheet 466, the antennas 426, the speaker assembly 413, and the casing 401. In accordance with some implementations, the casing 401 has a lip 434 for reflecting and directing light from the light diffuser 444 outward from the face of the camera 118.

In some implementations, the cover element 404 comprises a chemically-strengthened glass. In some implementations, the cover element 404 comprises a soda-lime glass.

In some implementations, the image sensor assembly 432 includes a circuit board (e.g., a PCB board), an IR cut filter, a lens holder, and an image sensor. In some implementations, the image sensor comprises a 4 k image sensor. In some implementations, the image sensor comprises a 12 megapixel sensor. In some implementations, the image sensor comprises a wide-angle lens.

In some implementations, the thermally conductive sheet 466 is adapted to dissipate heat generated by the main board 464 and/or transfer heat from the main board 464 to the speaker assembly 413 for subsequent dissipation outside of the camera via the rear portion of the casing 401. In some implementations, the conductive sheet 466 is a graphite sheet. When a graphite sheet is placed near the antenna system with multiple antennas, it can create a coupling medium between antennas. The increased coupling caused by the graphite can decrease the isolation between two antennas, thus degrading antenna efficiency or causing permanent damage to the chipset.

In some implementations, the antennas 426 are configured to enable the camera 118 to wirelessly communication with one or more other electronic devices, such as a hub device 180, a smart device 204, and/or a server system 164.

In some implementations, the fryer pot 428 is composed of magnesium. In some implementations, the fryer pot 428 is adapted to provide structural support to the camera 118.

In some implementations, the fryer pot 428, the main board 464, the conductive sheet 466, the speaker assembly 413, and the antennas 426 comprise a rear sub-assembly. Thermally de-coupling the fryer basket 424 from the fryer pot 428 prevents heat generated by the main board 464 from interfering with the image sensor assembly 432. In accordance with some implementations, heat generated by the front of the main board 464 is transferred to the fryer pot 428 to the heat pads 420 and dissipated outside of the camera via the casing 401 (e.g., the sides of the casing). In accordance with some implementations, heat generated by the back of the main board 464 is transferred to the thermally conductive sheet 466 to the speaker assembly 413 and dissipated outside of the camera via the back portion of the casing 401.

In some implementations, the rear sub-assembly is affixed to the casing 401 via one or more fasteners (e.g., via 2-3 screws). In some implementations, the cover element 404, the infrared reflector 442, the light diffuser 444, the light guide 446, the light ring 448, and the image sensor assembly 432 comprise a front sub-assembly. In some implementations, the front sub-assembly is affixed to the casing 401 via one or more fasteners (e.g., 2-3 screws). In some implementations, the front sub-assembly is affixed to the rear sub-assembly via one or more fasteners.

In some implementations, the fryer basket 424 is adapted to dissipate heat generated by the image sensor assembly 432 and/or the light ring 448. In some implementations, the fryer basket 424 includes one or more forward-facing microphones. In some implementations, the downward-facing microphone 450 is operated in conjunction with the microphones on the fryer basket 424 to determine directionality and/or location of incoming sounds.

In some implementations, the IR reflector 442 is coated with an IR and/or visible light reflective coating. In some implementations, the IR reflector 442 is adapted to direct light from the IR illuminators 452 to a scene corresponding to a field of view of the image sensor assembly 432.

In some implementations, the light ring 448 comprises a plurality of visible light illuminators (e.g., RGB LEDs), a plurality of IR illuminators 452, and circuitry for powering and/or operating the visible light and/or IR illuminators. In some implementations, the light guide 446 is adapted to direct light from the visible light illuminators out the face of the camera 118. In some implementations, the light guide 446 is adapted to prevent light from the visible light illuminators from entering the image sensor assembly 432. In some implementations, the light guide 446 is adapted to spread the light from the visible light illuminators in a substantially even manner. In some implementations, the light guide 446 is composed of a clear material. In some implementations, the light guide 446 is composed of a poly-carbonite material. In some implementations, the light guide 446 has a plurality of dimples to refract the light from the illuminators and prevent the light from entering the image sensor assembly 432. In some implementations, the light guide 446 is adapted to provide more uniform color and light output to a user from the illuminators. In some implementations, the light guide 446 includes a plurality of segments, each segment corresponding to a visible light illuminator. In some implementations, the light guide 446 includes one or more light absorbing elements (e.g., black stickers) arranged between each segment to prevent light leakage from one illuminator segment to another illuminator segment.

In some implementations, the light diffuser 444 includes two or more sections (e.g., an inner section and an outer section). In some implementations, the light diffuser 444 is adapted to diffuse the light from the visible light illuminators. In some implementations, the light diffuser 444 is adapted to direct the light from the illuminators toward the lip 434 of the casing 401. In some implementations, the light ring 448 (and corresponding elements such as the light guide 446 and/or light diffuser 444) causes a circular colored (or white) light to be emitted from the front of the camera 118. In some implementations the components and corresponding light are circular and arranged around the periphery of the front of the camera 118. They may encircle all or substantially all elements of the camera 118, such as the image sensor assembly 432, the IR illuminators 452, the ambient light sensor 451, a status LED, and the microphone apertures 406. In other implementations, they are arranged not around the periphery but rather at an inner diameter, e.g., around only the image sensor assembly 432. In yet other implementations, they do not surround any front-facing element of the camera 118. In some implementations, they are arranged in a non-circular shape, such as a square, oval, or polygonal shape. In some implementations, they are not arranged on the front of the device but rather a different surface of the device, such as the bottom, top, sides, or back. In some implementations, multiple such light rings and components are arranged onto the same or different surfaces of the camera 118.

The light ring 448 (and corresponding elements) may operate to indicate a status of the camera 118, another device within or outside of the smart home environment 100 (e.g., another device communicatively coupled either directly or indirectly to the camera 118), and/or the entire connected smart home environment 100 (e.g., system status). The light ring 448 (and corresponding elements) may cause different colors and/or animations to be displayed to a user that indicate such different statuses.

For example, in the context of communicating camera 118 status, when the camera 118 is booting for the first time or after a factor reset, the ring may pulse blue once at a slow speed. When the camera 118 is ready to begin setup, the ring may breathe blue continually. When the camera 118 is connected to a remote cloud service and provisioning is complete (i.e., the camera is connected to a user's network and account), the ring may pulse green once. When there is a service connection and/or provisioning failure, the ring may blink yellow at a fast speed. When the camera 118 is being operated to facilitate two-way talk (i.e., audio is captured from the audio and communicated to a remote device for output by that remote device simultaneously with audio being captured from the remote device and communicated to the camera 118 for output by the camera 118), the ring may breathe blue continuously at a fast speed. When the camera 118 is counting down final seconds before a factory reset, the ring may close on itself at a rate equal to the time until reset (e.g., five seconds). When the camera 118 has been factory and while the setting are being erased the ring may rotate blue continuously. When there is insufficient power for the camera 118 the ring may blink red continuously at a slow speed. The visual indications are optionally communicated simultaneously, concurrently, or separately from audio indications that signal to the user a same or supplemental message. For example, when the camera 118 is connected to a remote cloud service and provisioning is complete (i.e., the camera is connected to a user's network and account), the ring may pulse green once and output an audio message that "remote cloud service and provisioning is complete."

Additionally or alternatively, the camera 118 may communicate the status of another device in communication with the camera 118. For example, when a hazard detector 104 detects smoke or fire sufficient to alarm, the camera 118 may output a light ring that pulses red continuously at a fast speed. When a hazard detector 104 detects smoke or fire sufficient to warn a user but not alarm, the camera 118 may output a light ring that pulses yellow a number of times. When a visitor engages a smart doorbell 106 the camera 118 may output a light ring depending on the engagement; e.g., if the smart doorbell 106 detects motion, the camera 118 may output a yellow light ring, if a user presses a call button on the smart doorbell 106, the camera 118 may output a green light ring. In some implementations, the camera 118 may be communicatively coupled to the doorbell 106 to enable audio communication therebetween, in which case an animation and/or color of the light ring may change depending on whether the user is speaking to the visitor or not through the camera 118 or another device.

Additionally or alternatively, the camera 118 may communicate the cumulative status of a number of network-connected devices in the smart home environment 100. For example, a smart alarm system 122 may include proximity sensors, window break sensors, door movement detectors, etc. A whole home state may be determined based on the status of such a plurality of sensors/detectors. For example, the whole home state may be secured (indicating the premises is secured and ready to alarm), alarming (indicating a determination that a break-in or emergency condition exists), or somewhere in between such as pre-alarming (indicating a determination that a break-in or emergency condition may exist soon or unless some condition is satisfied). For example, the camera 118 light ring may pulse red continuously when the whole home state is alarming, may pulse yellow when the whole home state is pre-alarming, and/or may be solid green when the whole home state is secured. In some implementations, such visual indications may be communicated simultaneously (or separately from) with audio indications that signal to the user the same or supplemental message. For example, when the whole home state is alarming, the ring may pulse red once and output an audio message that indicates the alarm "alarm". In some implementations, the audio message may provide supplemental information that cannot be conveyed via the light ring. For example, when the whole home state is alarming due to a basement window being broken, the audio message may be "alarm—your basement window has been broken." For another example, when a pre-alarm amount of smoke has been detected by a hazard detector 104 located in the kitchen, the audio message may be "warning—smoke is detected in your kitchen."

In some implementations, the camera 118 may also or alternatively have a status LED. Such a status LED may be used to less-intrusively communicate camera 118, other device, or multiple device status information. For example, the status light may be solid green during initial setup, solid green when streaming video and/or audio data normally, breathing green when someone is watching remotely, solid green when someone is watching remotely and speaking through the camera 118, and off when the camera 118 is turned off or the status LED is disabled. It should be appreciated that the status LED may be displayed simultaneously with the light ring. For example, the status LED may be solid green during setup while the light ring breathes blue, until the end of setup when the device is connected to the service and provisioning is complete whereby the status LED may continue to be solid green while the light ring switches to a single pulse green.

Figure 5A:
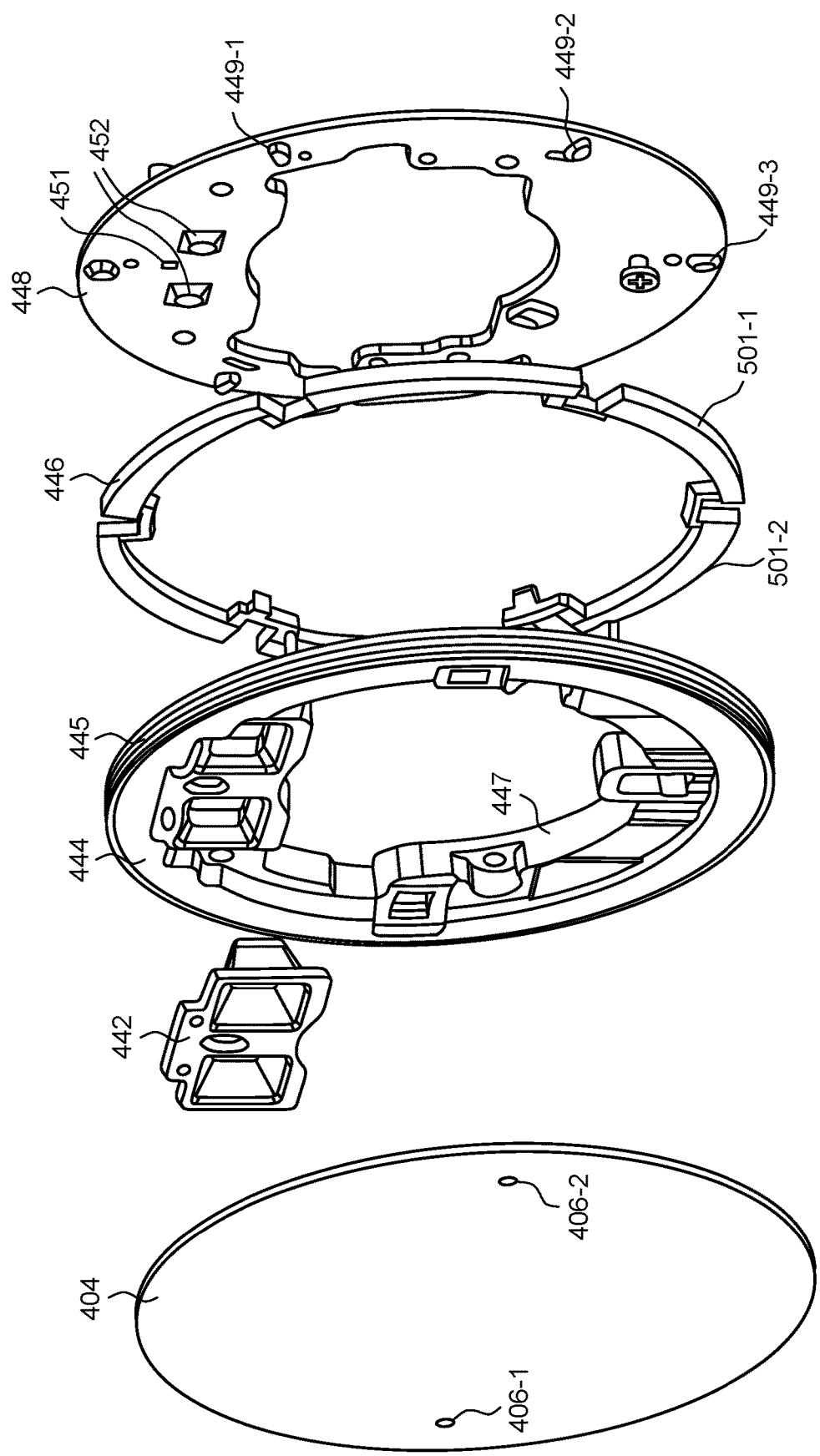
FIGS. 5A-5D are component views illustrating a representative camera assembly in accordance with some implementations.

FIGS. 5A-5D are component views illustrating a representative camera assembly in accordance with some implementations. FIG. 5A shows an expanded view of a cover element assembly composed of the cover element 404, the IR reflector 442, the light diffuser 444, the light guide 446, and the light ring 448. In accordance with some implementations, the cover element 404 includes microphone apertures 406. In accordance with some implementations, the light diffuser 444 includes a first (inner) section 447 and a second (outer) section 445. In some implementations, the inner section 447 is comprised of structural poly-carbonite. In some implementations, the outer section 445 is transparent or semi-transparent to visible light. In accordance with some implementations, the light ring 448 includes IR illuminators (e.g., IR LEDs) 452, visible light illuminators (e.g., RGB LEDs) 449, and an ambient light sensor 451. In some implementations, the visible light illuminators 449 comprise 6 RGB LEDs. In some implementations, the visible light illuminators 449 are configured to be controlled individually (e.g., controlled by the SoC 1004). In some implementations, each illuminator corresponds to a portion of the light guide 446. For example, the light guide 446 in FIG. 5A includes a first portion 501-1 corresponding to the illuminator 449-2 and a second portion 501-2 corresponding to the illuminator 449-3. As shown in FIG. 5A, in accordance with some implementations, each illuminator 449 is oriented in a clockwise manner and the light guide 446 includes a corresponding portion extending from the location of the illuminator 449 in a clockwise direction. In some implementations, each portion of the light guide 446 ends with, or is bounded by, a segmentor (e.g., a light-absorbing substance) that is adapted to prevent light from the illuminator from entering other portions of the light guide. In some implementations, one or more surfaces of the light guide 446 not facing the front of the camera are coated or otherwise treated with a light absorbing substance (e.g., a black ink) to prevent light from the illuminators 449 from exiting the light guide 446 at that location. In some implementations, the illuminators 449 are in a non-clockwise (e.g., counter-clockwise) orientation.

In some implementations, the IR illuminators comprise IR LEDs having a wavelength of 940 nanometers. In some implementations, the IR illuminators comprise IR LEDs having a wavelength of 850 nanometers. In some implementations, the image sensor for the camera 118 is less sensitive to 940 nm light than it is to 850 nm light. Therefore, IR LEDs having a 940 nm wavelength cause less interference with the image sensor than IR LEDs having an 850 nm wavelength.

In some implementations, the cover element 404 consists of a single-piece element (e.g., a glass or plastic lens) that resides over the entire front of the camera, including both the image sensor assembly 432 and the IR illuminators 452. In some implementations, the cover element 404 is a single-piece cover glass having a thickness of 1 mm, or approximately 1 mm. One problem with a single-piece element is IR light entering the element at an angle, scattering, and exiting the element into the image sensor. This creates a white ghost effect, increases noise, and reduces visibility of the intended field of view. The result is poor night vision performance. In some implementations, a light absorbing coating (e.g., a film or ink) and anti-reflective coating is added onto the rear of the element to prevent the light scattering. In some implementations, this coating is located between the area used for IR illumination and the image sensor entrance, all on the same piece of cover element. In some implementations, the coating comprises a smooth, matte ink that is light absorbing across all wavelengths of light.

In some implementations, the cover element 404 includes a silkscreen logo. In some implementations, a first section of the cover element 404 is coated with an opaque film adapted to absorb visible and IR light. In some implementations, the film is an ink. In some implementations, second sections of the cover element 404 (e.g., corresponding to the IR illuminators 452) are coated with an IR transparent film adapted to absorb visible light (e.g., is opaque or semi-opaque to visible light). In some implementations, third sections of the cover element 404 are coated with a film that is semi-transparent (e.g., semi-transparent to IR and/or visible light), the third sections corresponding to a status illuminator and/or an ambient light sensor. In some implementations, the cover element 404 is coated with an anti-reflection coating. For example, the cover element 404 is coated first with the thin films then with the anti-reflection coating on top of the thin films. In some implementations, the coatings are applied to the inner surface of the cover element 404. In some implementations, at least one of the coatings is applied to the outer surface of the cover element 404. In some implementations, the cover element 404 has an anti-reflection coating applied to both the inner and outer surfaces. In some implementations, the cover element 404 includes an opaque coating to prevent, or substantially prevent, light from the light ring 448 from entering the image sensor.

In some implementations, one or more of the coatings comprise a smooth ink adapted to absorb, not scatter, light. For example, an opaque ink adapted to absorb visible and IR light. In some implementations, one or more of the coatings are adapted to absorb at least 99% of the light. For example, the opaque coating is adapted to absorb at least 99% of visible and IR light. In some implementations, one or more of the coatings comprise a rough ink adapted to scatter light. In some implementations, one or more of the coatings are applied via vapor deposition. In some implementations, one or more of the coatings are applied via thin film deposition. In some implementations, one or more of the coatings are applied via a pattern printing process. In some implementations, one or more of the coatings are applied via a spray-on process.

Figure 5B:
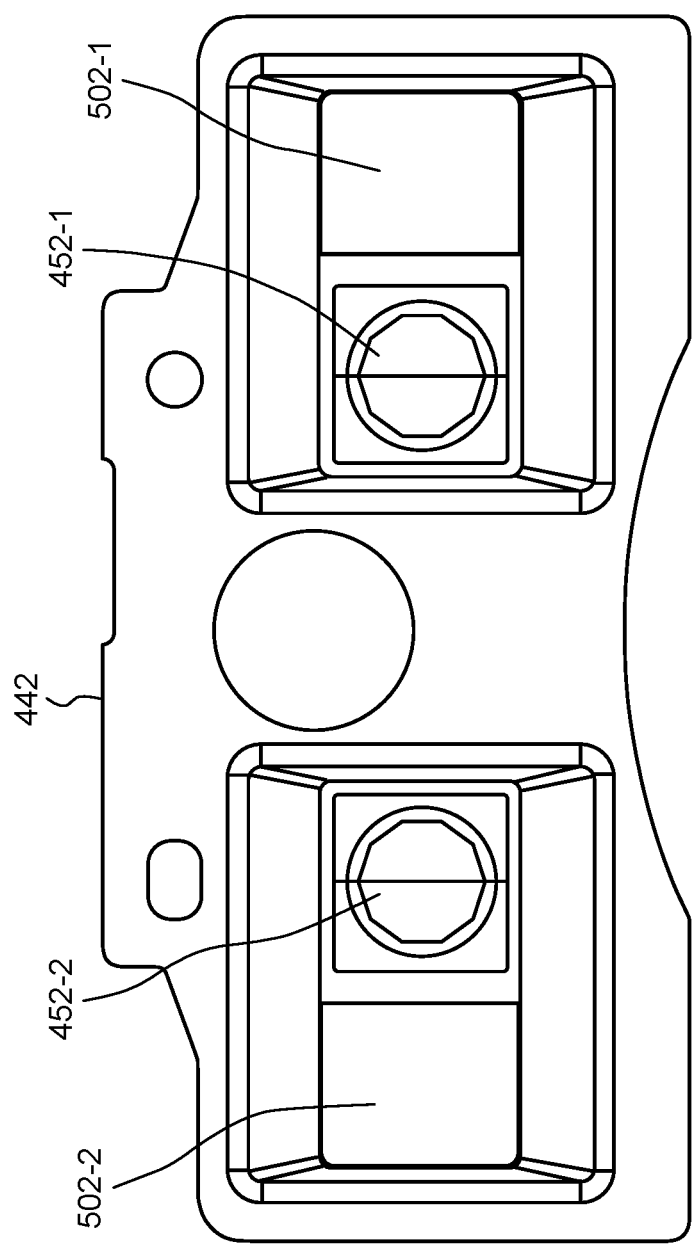

FIG. 5B shows the IR reflector 442 with cavities 502 for directing light from the IR illuminators 452. In some implementations, the IR reflector 442 is adapted to improve efficiency of the IR illuminators 452. The IR reflector 442 is particularly important when using IR illuminators having a wavelength that is not optimal for the image sensor, since more intensity is needed in order to illuminate the scene for the image sensor. In some implementations, the IR reflector 442 is adapted to prevent hot spots in the scene due to overlapping illumination from multiple IR illuminators. In some implementations, the IR reflector 442 is adapted to direct and/or restrict the illumination from the IR illuminators to the portion of a scene captured by the image sensor. For example, when the image sensor is adapted to capture a 16:9 rectangular portion of the scene the IR reflector 442 is adapted to provide substantially uniform illumination in that portion and substantially no illumination outside of that portion.

In some implementations, the camera 118 includes a plurality of IR reflectors, each corresponding to particular IR illuminators. For example, the camera 118 includes four IR illuminators and two IR reflectors, where the first IR reflector is for directing light from the first two IR illuminators and the second IR reflector is for directing light from the second two IR illuminators. In some implementations, the multiple IR reflectors are configured such that the IR illumination from IR illuminators corresponding to the multiple IR reflectors is directed to provide substantially uniform illumination in a portion of a scene corresponding to the camera's field of view, and substantially no illumination outside of that portion. In some implementations, the camera's image sensor is adapted to capture wide angle images (e.g., a fisheye view). In some implementations, the IR reflector(s) are configured to provide substantially uniform illumination over the wide angle field of view, with substantially no illumination outside of that field of view.

In some implementations, the image sensor is configured to capture IR light (e.g., IR light having a wavelength of 940 nm or 850 nm). In some implementations, the IR light is converted (e.g., at the camera 118) to white light for display to a user. In some implementations, the IR illuminators 452 consist of two IR LEDs. In some implementations, the wavelength of the IR illuminators 452 is adjusted to be further from the visible spectrum. For example, the wavelength of the IR illuminators is adjusted to 940 nm rather than 850 nm. Adjusting the IR illuminators to be further from the visible spectrum of light means that the IR illumination from the illuminators is less visible (or invisible) to the human eye. In some implementations, the image sensor is tuned to 850 nm IR light, rather than 940 nm IR light. In some implementations, the IR illuminators are configured to emit 940 nm light and operate with increased power (e.g., double the power) to provide similar illumination to the image sensor (e.g., an image sensor tuned for 850 nm IR light) as would be provided by IR illuminators configured to emit at 850 nm. Therefore it is important that the IR illuminators are used as efficiently as possible. For example, the IR illuminators are configured to only illuminate the portion of the scene that is captured by the image sensor.

In some implementations, the image sensor has a rectangular field of view corresponding to +/−32 degrees vertical and +/−56 horizontal. In some implementations, the IR illuminators 452 are configured to emit light in a hemispherical pattern. Therefore, there is a need to direct and shape the light from the IR illuminators to illuminate the image sensor's field of view, while minimizing illumination outside of the field of view and overlap between IR illuminators causing hot spots in the sensed image.

In some implementations, the IR reflector 442 is configured to direct and shape the light from the IR illuminators to illuminate the image sensor's field of view, while minimizing illumination outside of the field of view and overlap between IR illuminators causing hot spots in the sensed image. In some implementations, the IR reflector 442 is composed of plastic and/or metal. In some implementations, the IR reflector 442 is coated with an IR reflective coating (e.g., silver). In some implementations, the IR reflector 442 is adapted to reflect substantially all IR light (e.g., 95%, 98%, 99% of IR light is reflected). In some implementations, the IR reflector 442 includes a rectangular cavity 502 for each IR illuminator 452. In some implementations, the rectangular cavities 502 are each configured to shape the IR light from the IR illuminators to correspond to the field of view of the camera 118 (e.g., of an image sensor of the camera 118). In some implementations, each cavity 502 includes an opening for the corresponding IR illuminator 452. In some implementations, the cavities 502 and illuminators 452 are positioned to minimize overlap in illumination between the IR illuminators 452. In some implementations, the cavities 502 are positioned such that illumination from the IR illuminators 452 is substantially uniform across the field of view of the image sensor. In some implementations, the cavities 502 are positioned so as to provide increased illumination (e.g., 1.2, 1.5, or 2 times the illumination) in the center of the field of view of the camera.

In some implementations, the IR reflector 442 is configured to restrict illumination from the IR illuminators to only illuminate the field of view of the camera. In some implementations, the IR reflector 442 is configured to optimize energy distribution from the IR illuminators in the field of view of the camera. In some implementations, the IR reflector 442 is configured to maximize the energy from the IR illuminators within the field of view of the image sensor while minimizing the energy wasted outside of the image sensor's field of view. In some implementations, the IR reflector is configured to shape the illumination from the IR illuminators such that the field of view of the camera is uniformly illuminated and areas outside of the field of view of the camera are not illuminated.

Figure 5C:
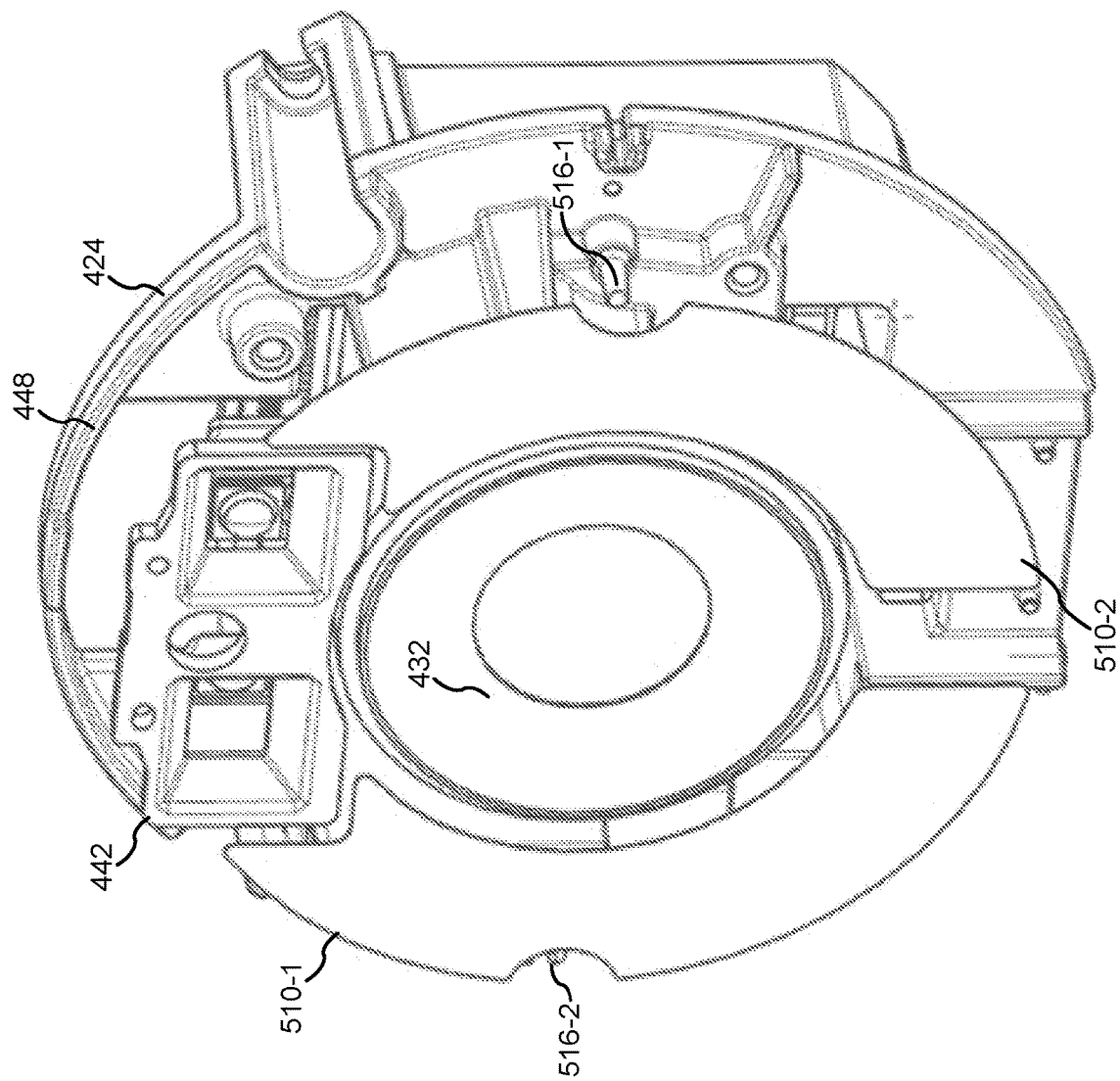

FIG. 5C illustrates several components of the camera 118 in accordance with some implementations. FIG. 5C shows the image sensor assembly 432 seated within the fryer basket 424, the IR reflector 442 affixed to the light ring 448, heat spreaders 510 that operate to transfer heat from the fryer basket 424 and image sensor assembly 432 to the cover element 404, and microphones 516 corresponding to apertures 406. In some implementations, the heat spreaders 510 are affixed to cover element 404. In some implementations, the heat spreaders 510 are adapted to substantially prohibit heat from affecting the images captured by the image sensor by redirecting heat away from the image sensor assembly 432 and toward the cover element 404 for emission outside the front face of the camera.

Figure 5D:
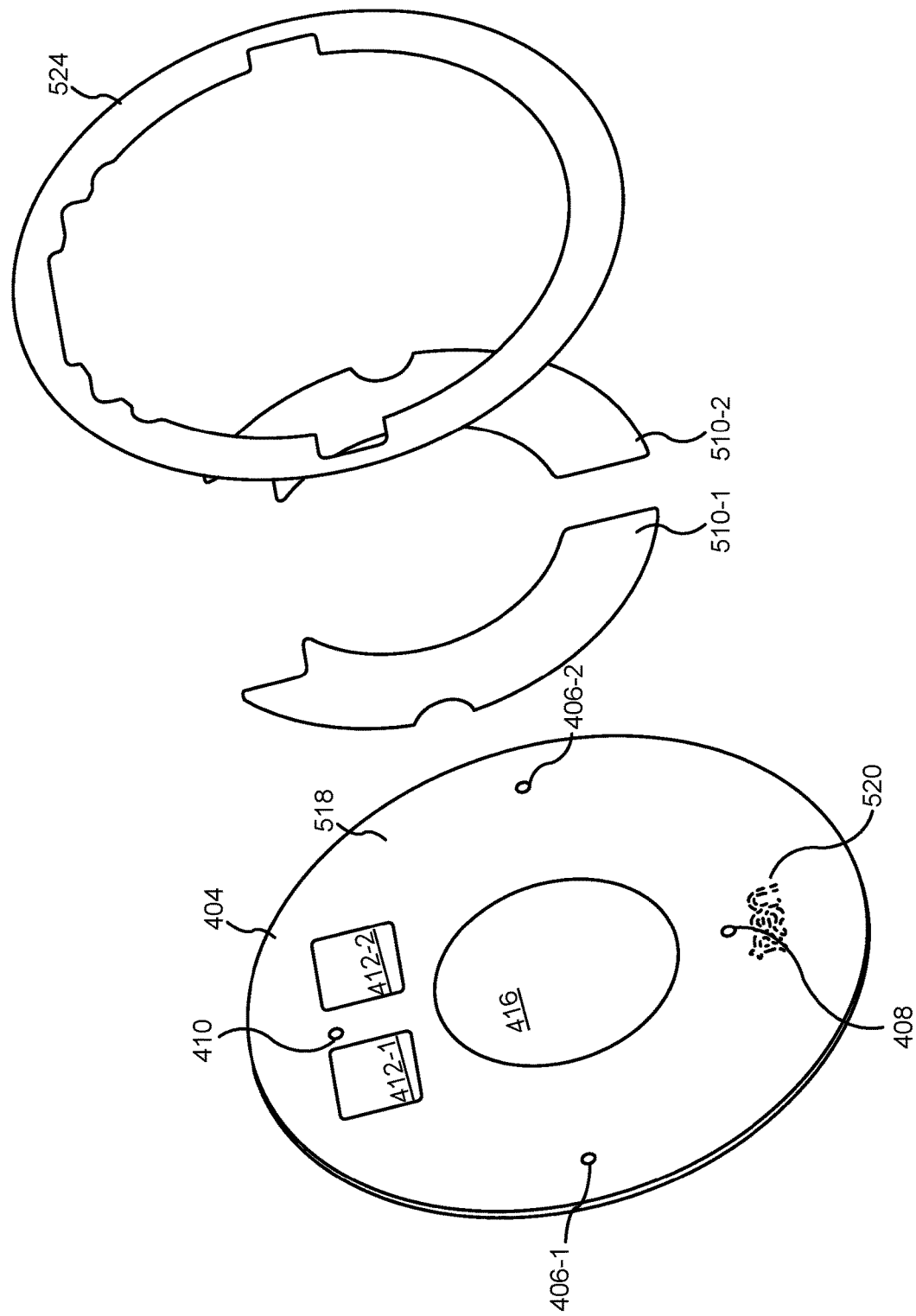

FIG. 5D illustrates several components of the camera 118 in accordance with some implementations. FIG. 5D shows the cover element 404 with sections 412 corresponding to the IR illuminators 452, section 416 corresponding to the image sensor assembly 432, section 518, section 410 corresponding to an ambient light sensor, and section 408 corresponding to a status LED. FIG. 5D also shows the cover element 404 having apertures 406 for the microphones 516 and a logo 520 (or other words, letters, or numbers). In some implementations, the sections 412 are transparent to infrared light. In some implementations, the sections 412 are opaque or substantially opaque (e.g., 70%, 80%, or 90% opaque) to visible light. In some implementations, the sections 412 are coated by a thin film (e.g., an ink) that is transparent to IR light, but absorbs visible light. In some implementations, the section 416 is transparent to visible light and at least some wavelengths of IR light (e.g., 850 nm and/or 940 nm IR light). In some implementations, the section 518 is opaque or substantially opaque (e.g., 70%, 80%, or 90% opaque) to visible light and/or IR light. In some implementations, the section 518 is coated by a thin film (e.g., an ink) that absorbs visible light and at least some wavelengths of IR light (e.g., 850 nm and/or 940 nm IR light). In some implementations, the section 410 is semi-transparent to visible light (e.g., absorbs 30%, 50%, or 70% of visible light). In some implementations, the section 410 is opaque or substantially opaque to at least some wavelengths of IR light (e.g., 850 nm and/or 940 nm IR light). In some implementations, the section 408 is semi-transparent to visible light (e.g., absorbs 30%, 50%, or 70% of visible light). In some implementations, the section 408 is opaque or substantially opaque to at least some wavelengths of IR light (e.g., 850 nm and/or 940 nm IR light). In some implementations, the logo 520 is applied as a silkscreen (e.g., a silver silkscreen). In some implementations, the coatings discussed above are applied to an interior side of the cover element 404. In some implementations, some or all of the coatings discussed above are applied to an exterior side of the cover element 404. In some implementations, an anti-reflective coating is applied to the cover element 404. In some implementations, the anti-reflective coating is applied over some or all of the coatings discussed above. In some implementations, an anti-reflective coating is applied to an interior side of the cover element 404. In some implementations, an anti-reflective coating is applied to an exterior side of the cover element 404 (e.g., instead of, or in addition to, applying the anti-reflective coating to the interior side). In some implementations, an anti-smudge coating is applied to an exterior side of the cover element 404. In some implementations, a hydrophobic coating is applied to an exterior side of the cover element 404. For example, in accordance with some implementations, the cover element 404 includes an anti-reflective coating and a hydrophobic coating on the exterior side, with the hydrophobic coating covering the anti-reflective coating.

FIG. 5D further shows heat spreaders 510 and adhesive 524. In some implementations, the heat spreaders 510 are configured to prohibit heat (e.g., heat generated by components of the camera 118) from interfering with the image sensor (e.g., distorting a captured image). In some implementations, the heat spreaders 510 are configured to evenly distribute heat through the cover element 404 (e.g., to prevent hotspots on the cover element). In some implementations, the adhesive 524 is configured to attach the cover element 404 to the light diffuser 444. In some implementations, the adhesive 524 is configured to affix the cover element 404 to one or more other components of the camera 118.

Figure 6A:
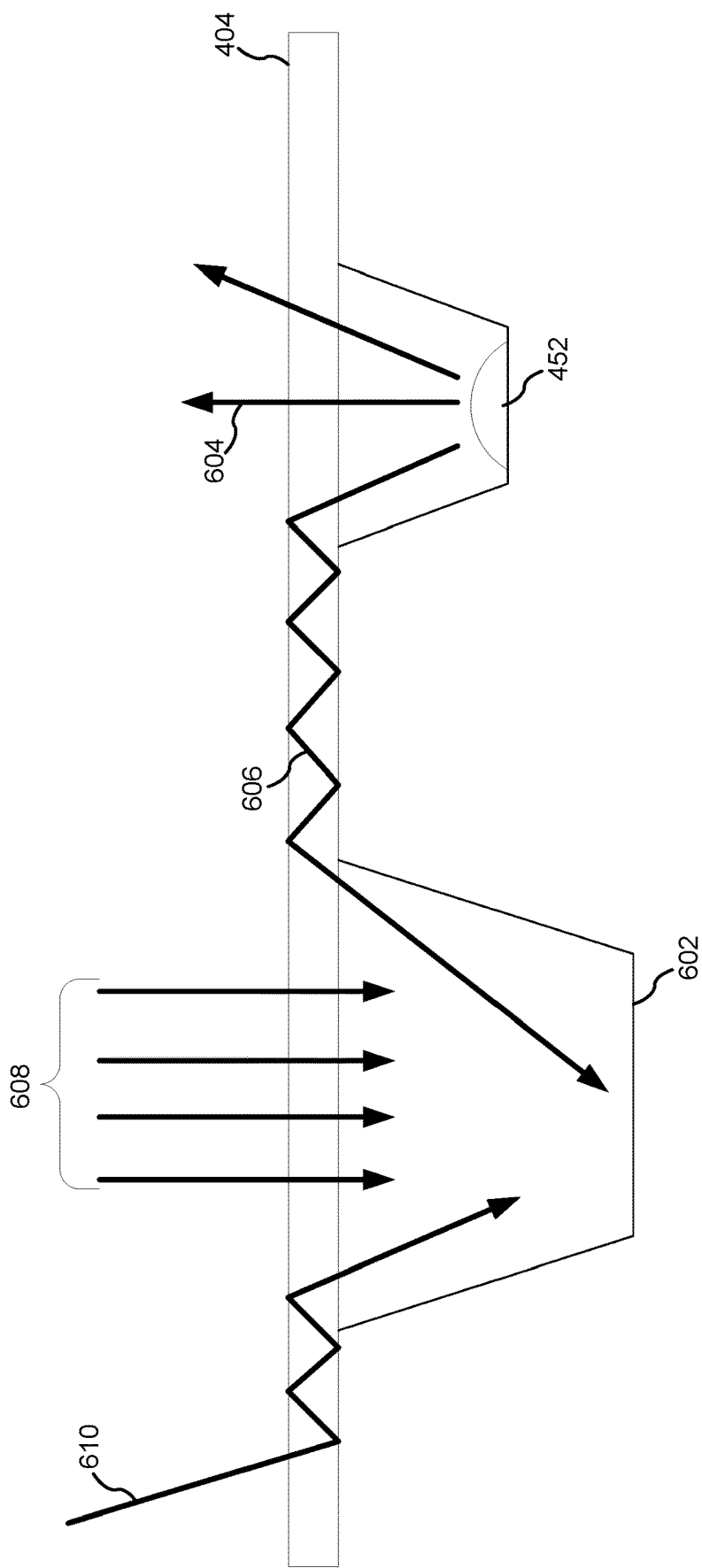
FIGS. 6A-6B illustrate prophetic light interaction with representative cover elements in accordance with some implementations.
Figure 6B:
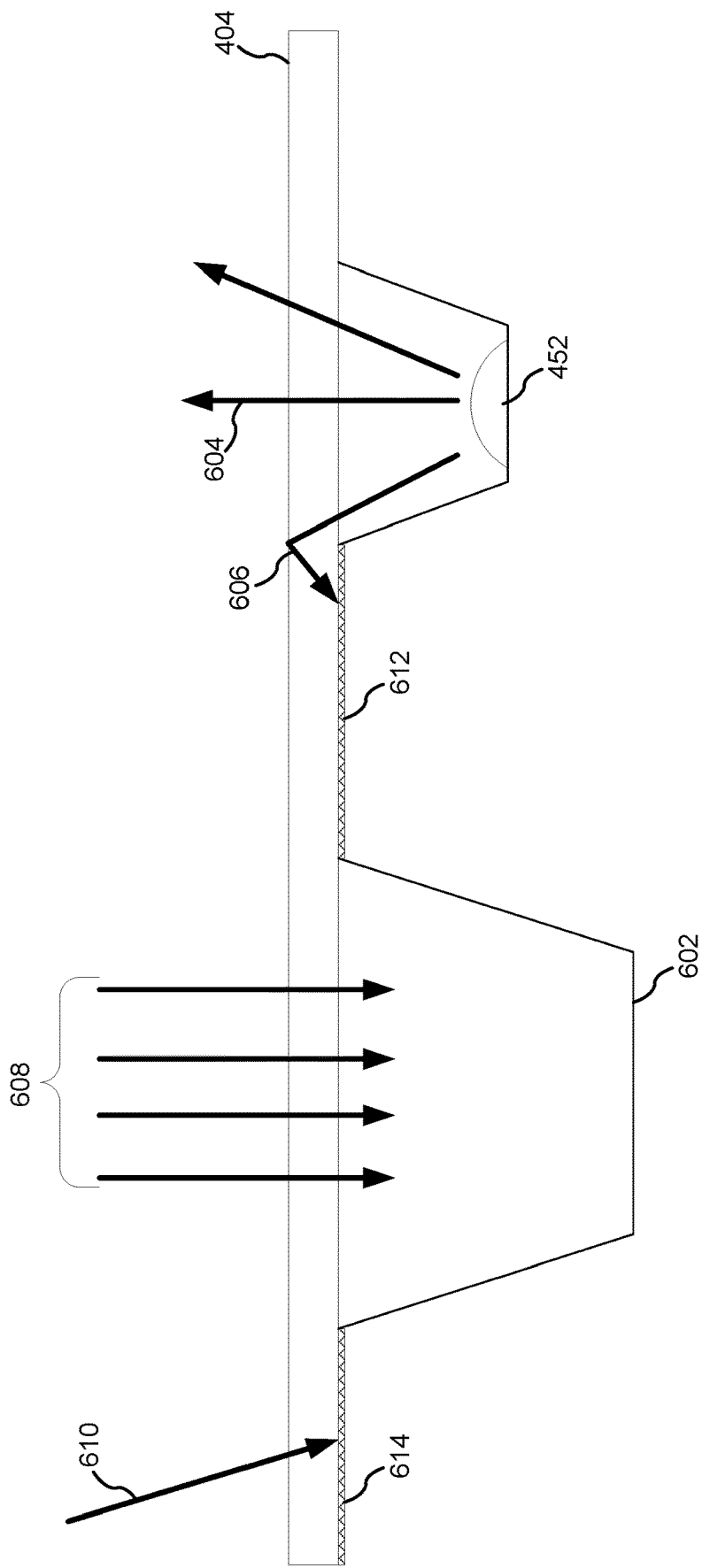

FIGS. 6A-6B illustrate prophetic light interaction with representative cover elements in accordance with some implementations. FIG. 6A shows a representative cover element 404 without any coating applied, an IR illuminator 452, and an image sensor 602. The image sensor 602 captures illumination 608 from a scene. The image sensor 602 also captures illumination 610 and illumination 606 reflected by the cover element 404. The illumination 604 from the IR illuminator(s) 452 is directed out toward a scene. However, as shown in FIG. 6A, a portion 606 of the illumination reflects off the cover element 404 and into the image sensor 602. In some cases, the illumination 606 and 610 cause anomalies and/or white out in a captured image.

FIG. 6B shows a representative cover element 404 with a coating 612 applied to a section of the cover element 404 between the IR illuminator 452 and the image sensor 602. FIG. 6B also shows a coating 614 applied to a section of the cover element 404 adjacent to the image sensor 602. In accordance with some implementations, the coating 612 and the coating 614 are adapted to absorb the illumination 606 and 610 respectively, thereby preventing light 604 from the illuminator 452 or peripheral light 610 from intruding into the image sensor 602 due to transmission through the single piece cover element 404. In some implementations, the coating 614 and the coating 612 are adapted to absorb visible and IR light. In some implementations, the coating 614 is adapted to absorb visible light and the coating 612 is adapted to absorb IR light. In some implementations, the coatings (e.g., coating 614 and/or coating 612) are adapted to absorb light having wavelengths that are capture-able by the image sensor 602. In some implementations, one or more of the coatings 612 and 614 comprise a light-absorbing ink. In some implementations, one or more of the coatings 612 and 614 comprise a light-absorbing thin-film. In some implementations, one or more of the coatings 612 and 614 is adapted to refract at least a portion of incident light. In some implementations (not shown), one or more additional coatings are applied to the cover element 404. For example, in accordance with some implementations, the section of the cover element 404 covering the IR illuminator 452 is coated with a visible-light absorbing ink or thin-film. As another example, in some implementations, the cover element 404 is coated with an anti-smudge coating and/or an anti-reflective coating. In some implementations, alternatively to, or in addition to, applying the various coatings described above, the cover element 404 is treated so as to change transmission, reflection, and/or absorption properties various portions of the cover element 404. For example, a first portion of the cover element 404 is treated (e.g., chemically altered) so as to be opaque to visible light, while a second portion of the cover element 404 is treated so as to be opaque to certain wavelengths of infrared light.

Although the cover element 404 is described above with reference to camera assembly 118, the cover element 404 (and one or more of the coatings described above) are optionally used with other types of electronic devices. In some implementations, the cover element 404 (and zero or more of the associated coatings) are used with an electronic device having a receiver adapted to receive a particular type of waves and a transmitter adapted to transmit the particular type of waves. For example, the cover element 404 techniques and materials are applicable to any situation where a single-piece transmissive material covers both a sensor and one or more transmitters in an electronic device, where the sensor is sensitive to signals from the transmitters. In some implementations, the cover element 404 and associated techniques are applicable when there is a possibility that stray (e.g., unwanted) signals from a transmitter of the device can be received by the sensor due to the signals being reflected within the transmissive material. For example, such electronics devices can include cameras, smart phones, tablets, smart home devices, laptops, and the like.

Although the implementations are described as including particular numbers of components (e.g., 3 microphones, 3 antennas, 2 IR illuminators, etc.), these numbers are not intended to be limiting. The number of these components is optionally varied, from zero or one to many (e.g., 4, 6, or 10) in different implementations, as would be apparent to one skilled in the art based on technical, aesthetic, and/or budgetary requirements and/or preferences.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A camera assembly, comprising:
   an image sensor having a field of view corresponding to a scene;
   one or more infrared (IR) illuminators configured to selectively illuminate the scene; and
   a single-piece cover element positioned in front of the image sensor and the one or more IR illuminators such that light from the one or more IR illuminators is directed through the cover element and light from the scene passes through the cover element prior to entering the image sensor, the cover element including:
      a first portion corresponding to the image sensor, the first portion being substantially transparent to visible light and IR light;
      a second portion corresponding to the one or more IR illuminators, the second portion being substantially transparent to IR light; and
      a third portion between the first portion and the second portion, the third portion being substantially opaque to IR and/or visible light.

2. The camera assembly of claim 1, wherein the second portion of the cover element is coated with a thin film that is substantially opaque to visible light.

3. The camera assembly of claim 2, wherein the thin film is an IR-transparent ink.

4. The camera assembly of claim 3, wherein the IR-transparent ink is applied to an inner surface of the cover element, the inner surface of the cover element facing the image sensor and the one or more IR illuminators.

5. The camera assembly of claim 1, wherein the third portion of the cover element substantially prevents light from the one or more IR illuminators from entering the image sensor without interacting with the scene.

6. The camera assembly of claim 1, wherein the third portion of the cover element is coated with a thin film that is substantially opaque to visible light and IR light.

7. The camera assembly of claim 6, wherein the thin film substantially prohibits light from the one or more illuminators from reflecting within the cover element to the image sensor.

8. The camera assembly of claim 6, wherein the thin film absorbs light from the one or more IR illuminators.

9. The camera assembly of claim 1, further comprising an anti-reflection coating applied to the cover element.

10. The camera assembly of claim 9, wherein the anti-reflection coating is applied to an inner surface of the cover element, the inner surface facing the image sensor and the one or more IR illuminators.

11. The camera assembly of claim 1, further comprising a visible illuminator configured to convey status information of the camera assembly to a user;
   wherein the cover element is positioned in front of the visible illuminator such that light from the visible illuminator is directed through the cover element; and
   wherein the cover element includes a fourth portion corresponding to the visible illuminator, the fourth portion being at least semi-transparent to visible light.

12. The camera assembly of claim 1, further comprising an ambient light sensor configured to detect ambient light corresponding to the scene;

wherein the cover element is positioned in front of the ambient light sensor such that light from the scene passes through the cover element prior to entering the ambient light sensor; and wherein the cover element includes a fourth portion corresponding to the ambient light sensor, the fourth portion being at least semi-transparent to visible light.

13. The camera assembly of claim 1, wherein one or more IR illuminators are configured to emit a particular wavelength of IR light; and wherein the second portion of the cover element is coated to be substantially transparent to the particular wavelength of IR light.

14. The camera assembly of claim 1, wherein the second portion of the cover element is coated to be substantially opaque to visible light.

15. The camera assembly of claim 1, wherein the third portion of the cover element separates the first portion and the second portion.

16. A camera system, comprising:

an image sensor having a field of view corresponding to a scene;

one or more infrared (IR) illuminators configured to selectively illuminate the scene; and a single-piece cover element positioned in front of the image sensor and the one or more IR illuminators such that light from the one or more IR illuminators is directed through the cover element and light from the scene passes through the cover element prior to entering the image sensor, the cover element including:

a first means for enabling visible light and IR light to pass from the scene to the image sensor;

a second means for enabling IR light to pass from the one or more IR illuminators to the scene; and means for preventing IR and/or visible light from passing through a location between the first means and the second means.

17. The camera system of claim 16, wherein the cover element comprises a single, flat piece of cover glass.

18. The camera system of claim 16, wherein the single-piece cover element is a single piece of optically transparent material capable of uninterrupted transmission of light throughout.

19. The camera system of claim 16, further comprising:

one or more visible illuminators configured to selectively provide visible illumination;

a third means for enabling visible light to pass from the one or more visible illuminators; and means for preventing visible light from passing through a location between the first means and the third means.

20. The camera system of claim 16, further comprising means for preventing visible light from passing through the cover element to the one or more IR illuminators.

* * * * *